United States Patent [19]

Hoffmann

[11] Patent Number: 4,884,661

[45] Date of Patent: Dec. 5, 1989

[54] CENTER-FILL TOP COVER FOR OILERS

[76] Inventor: Ralph M. Hoffmann, 15950 N. Hillcrest Ct., Eden Prairie, Minn. 55346

[21] Appl. No.: 300,131

[22] Filed: Jan. 23, 1989

[51] Int. Cl.$^4$ .................. F16N 11/00; F16N 19/00; B67C 3/00; B65D 51/16

[52] U.S. Cl. ........................... 184/88.1; 184/65; 184/80; 220/86 R; 220/303

[58] Field of Search ............ 184/88.1, 65, 45.1, 184/46, 80; 220/85 F, 86 R, 303

[56] References Cited

U.S. PATENT DOCUMENTS

| | | | |
|---|---|---|---|
| 206,579 | 7/1878 | Kilborn | 184/65 |
| 322,123 | 7/1885 | Pfingst | 184/80 |
| 325,264 | 9/1885 | Mills | 184/80 |
| 1,397,838 | 11/1921 | Lindenfield | 184/88.1 |
| 1,793,108 | 2/1931 | MacIndoe | 184/45.1 |
| 4,113,138 | 9/1978 | Fields et al. | 220/86 R |

OTHER PUBLICATIONS

Pictures 1-4 of top cover of oiler manufactured by Oil-Rite Corporation, Manitowoc, Wisc.
Data Sheet, Trico Manufacturing Corp., p. 28.

Primary Examiner—Henry A. Bennet
Assistant Examiner—Denise L. Ferensic
Attorney, Agent, or Firm—Hill, Van Santen, Steadman & Simpson

[57] ABSTRACT

A top cover for oilers having an aperture centrally located about a disc-shaped body through which a lubricating fluid may be dispensed into the reservoir of the oiler is provided. Such a cover has an advantage in that a larger filling aperture is thus attained thereby providing for more efficient filling of the oiler reservoir and is further attained at no cost as a by-product of other necessary machining.

7 Claims, 2 Drawing Sheets

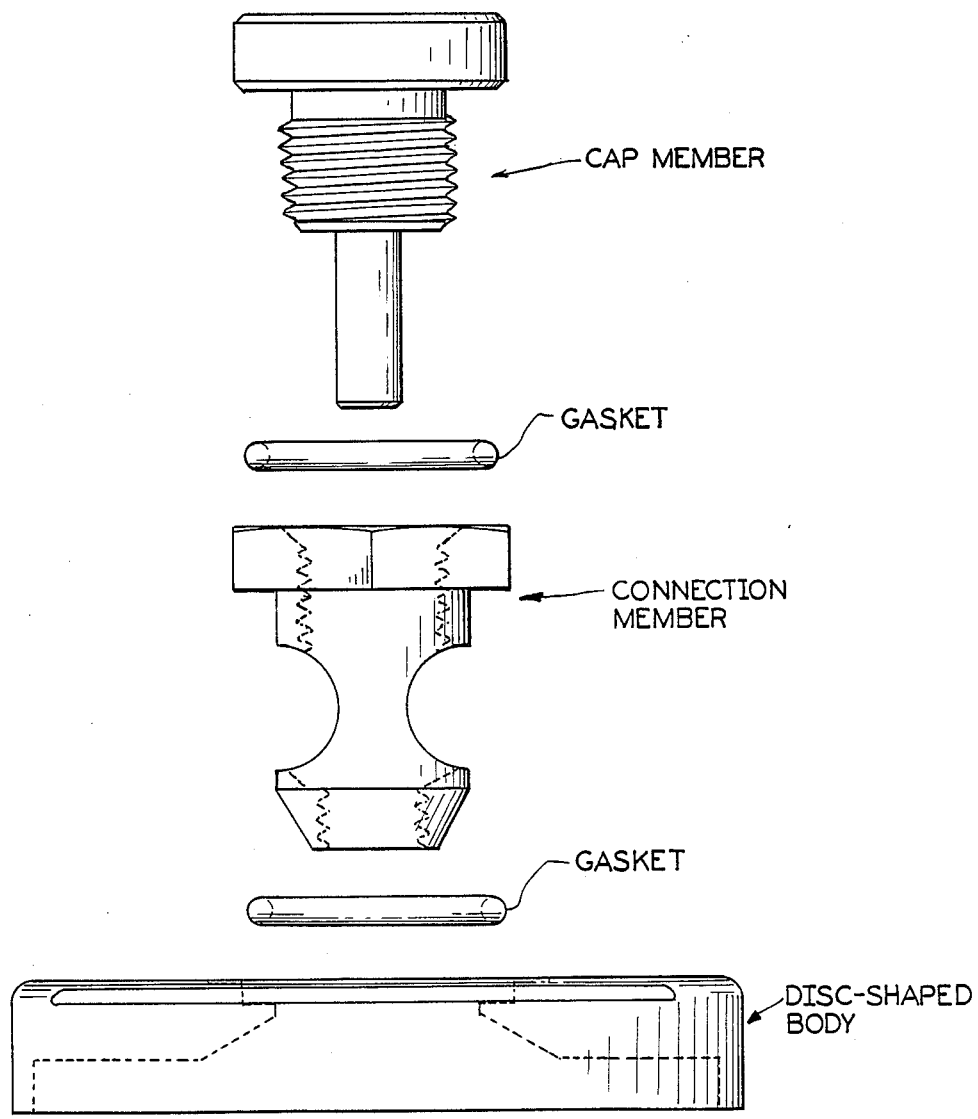

CENTER-FILL TOP COVER FOR OILERS

CROSS-REFERENCE TO RELATED APPLICATION

This application is related to my co-pending, commonly assigned patent application entitled "Constant Level Oiler", filed Jan. 23, 1989, Ser. No. 300,792 (P-88,2096).

BACKGROUND OF THE INVENTION

1. Field of the Invention

The present invention relates to a top cover for an oiler wherein the cover is provided with an aperture centrally located to enable the user to fill the oiler therethrough.

2. Description of the Prior Art

Devices known as oilers are employed to provide a steady flow of lubricant from a reservoir containing a lubricating fluid to a piece of operating machinery. Such oilers generally comprise a top and bottom cover disposed on opposite sides of a cylindrical reservoir and connected by a threaded rod extending axially through the center of the cylindrical reservoir thereby securing the top and bottom covers to the reservoir. The output of the reservoir is typically connected to one or more feed valves through which the lubricating fluid flows to the machinery needing lubrication.

Filling the reservoir is typically facilitated thru a circular aperture non-centrally located on the top cover through which the user may dispense a lubricating fluid into the reservoir. The aperture is covered by a hinged flap spring-loaded which must be extended to an upright position to expose the aperture before the reservoir may be filled.

Such top covers for oilers are disadvantaged in that the cost of manufacturing such covers is burdened by the attendant cost of adding the hinged flap as a separate entity. Likewise, such top covers are disadvantaged in that the small aperture size restricts the amount of fluid flowing therethrough. As a result, the lubricating fluid is often needlessly spilled during the filling process. Additionally, filling of the reservoir through the small aperture imposes the use of a squart-type can dispenser upon the user since most other filling means are impractical.

Other top covers for oilers, as shown in FIG. 6, are known which have a central filling aperture. Such covers generally comprise three separate and distinct members: a cap member, a disc-shaped body, and a hollow connection member. The disc-shaped body of such a cover typically possesses an aperture in the center. The hollow connection member is disposed within the aperture and is formed with a radially extending flange to seat the hollow connection member is disposed within the aperture and is formed with a radially extending flange to seat the hollow connection member therein. Gaskets are typically disposed above and below the radially extending flange to create an effective seal between the cap member and connection member as well as the connection member and the disc-shaped body. Additionally, the upper end of the connection member is structured to accommodate the cap member therein. The lower end of the connection member is formed to facilitate fastening to the connecting rod which extends axially through the center of the reservoir. The mid-region of the connection member is structures to create substantially open which allow fluid to flow therethrough during filling of the reservoir.

The center-fill top covers of the prior art as described herein above require an extensive amount of machining during manufacture thereof. Each of the three separate structures must be manufactured in a distinct and labor intensive series of steps. As such, each cover is burdened by the costs attendant with the use of three distinct parts.

It is an object of the present invention to specify a top cover for an oiler wherein the attendant manufacturing costs associated with adding a spring-loaded hinged flap to the cover as well as the problems associated with restricted fluid flow through the aperture during the filling process are eliminated.

It is a further object of the present invention to set forth a center-fill top cover for oilers designed to incorporate the features of the connecting member and disc-shaped body of the prior art covers into a single integrated structure, such that no additional machining is required and the apertures or openings are created as a by-product of the drilling and tapping operations.

SUMMARY OF THE INVENTION

A cover for an oiler or lubricant reservoir is provided which serves as the top cover for the container. This top cover has a larger fill aperture than heretofore possible by locating the aperture in the center of the top cover. A plurality of arms extend downward from the sidewalls of the aperture and connect about an annular body having a further aperture which is threaded. The arms are arranged so as to provide a substantially open region therebetween thereby enhancing the flow of lubricating fluid through the aperture and into the reservoir. The further aperture accepts and screws to the connecting rod proceeding axially through the center of the reservoir thereby securing assembly of the oiler.

A cap which is manufactured in a separate manufacturing process than used to make the cover body is used to close the aperture thereby eliminating the attendant cost associated with the use of a hinged flap. Additionally, the aperture and substantially open regions are achieved concurrent with drilling the hole for tapping, such that no additional machining is required and the aperture and openings are created as a by-product of the drilling and tapping operation required to accommodate the filler cap.

BRIEF DESCRIPTION OF THE DRAWINGS

Other objects, features and advantages of the invention will best be understood from the following detailed description taken in conjunction with the accompanying drawings, of which:

FIG. 6 is an exploded view of a prior art center-fill top cover for an oiler.

DESCRIPTION OF THE PREFERRED EMBODIMENT

Figure 1:
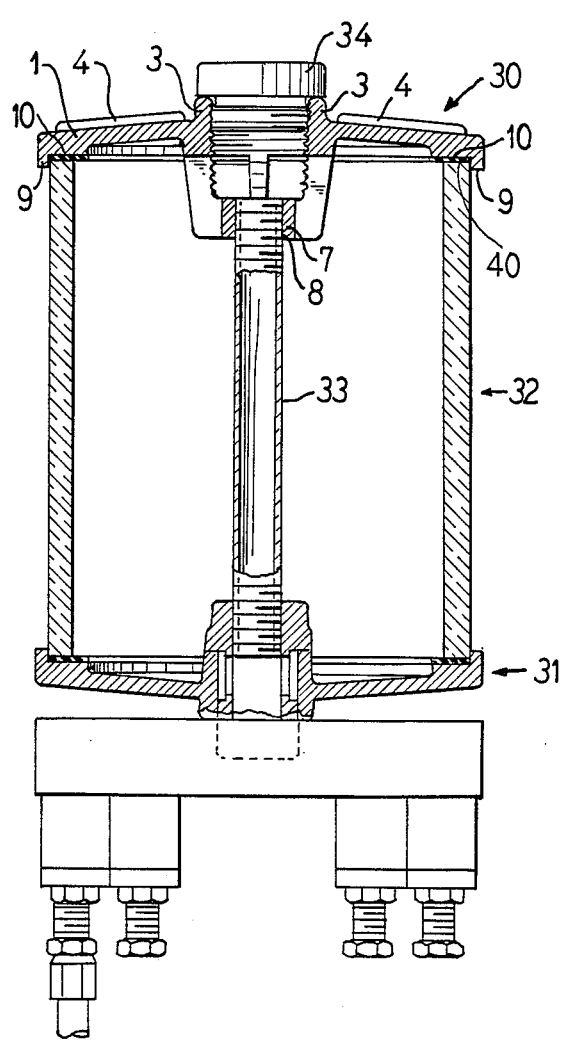
FIG. 1 is a view of an oiler having an embodiment of the present device attached thereto.
Figure 2:
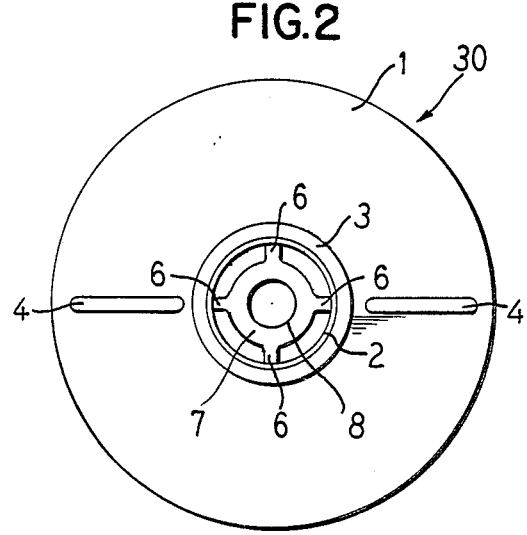
FIG. 2 is a top planar view of the top oiler cover shown in FIG. 1.

The device as shown in the above-cited figures has a disc-shaped body 1 having an aperture through the center which is defined by threaded sidewalls 2. A hub 3 proceeds upwardly from the disc-shaped body 1. Oblong protrusions 4 extend upwardly from the disc-shaped body 1 and are oriented radially from the center thereof.

A plurality of arms 6 extend downward from the disc-shaped body 1 about the sidewalls 2 of the aperture. Like the sidewalls 2 of the aperture, the interior facing regions of the arms 6 are threaded. The arms 6 are spaced apart so as to create a substantially open region therebetween. Attached at the end of the arms 6 opposite the disc-shaped body 1, there is an annular body 7 having a further aperture in the center. The further sidewalls 8 of the further aperture are also threaded.

A further hub 9 extends downward from the disc-shaped body 1 about the perimeter thereof. Interior and concentric to the further hub 9 is a substantially flat section 10.

FIG. 1 shows the instant device 30 operably attached as part of the oiler assembly. Such oiler assembly comprises the top cover 30, lower cover 31 and a reservoir 32 and is held together by the axial forces created when the top cover and lower cover are screwed to a threaded connecting rod 33. As shown, the further threaded sidewalls 8 of the annular body 7 engage the threaded connecting rod 33 which proceeds axially through the center of the reservoir 32 and terminates in a threaded connection to the lower oiler cover 31. The oblong protrusions 4 extending from the upper portion of the disc-shaped body 1 enable the user to grip the top cover firmly when screwing the top cover 30 to the threaded connecting rod 33.

To provide an effective seal between the top cover 30 and the reservoir 32, a gasket 40 is placed between the disc-shaped body 1 and the reservoir 32 at the substantially flat section 10. Additionally, the further hub 9 engages the exterior portion of the reservoir 32 thereby providing an effective seal therebetween.

A threaded cap 34 is provided to seal the aperture of the disc-shaped body 1. The cap 34 threadedly engages the sidewalls of the aperture of the disc-shaped body 1 thereby providing simple means for removal of the cap 34 during the filling of the reservoir 33. A particularly effective seal of the aperture is attained by using the hub 3 to engage the cap 34.

Figure 3:
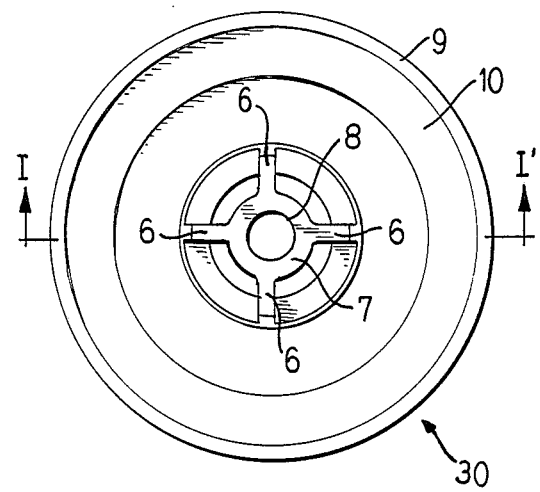
FIG. 3 is a bottom planar view of the top oiler cover shown in FIG. 1.
Figure 4:
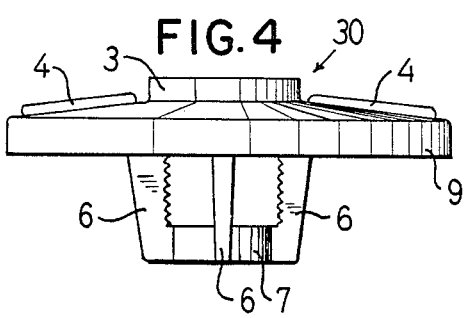
FIG. 4 is a side elevated view of the top oiler cover shown in FIG. 1.
Figure 5:
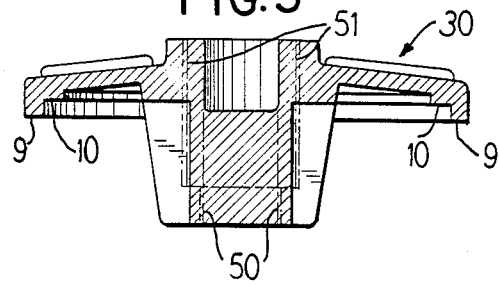
FIG. 5 shows a cross section of a casting of the present device as it would appear through section I-I' of FIG. 3 before machining.

Manufacture of the instant device can be accomplished in a particularly cost effective manner. A casting possessing the principal features of the cover is easily machined to form the final product. FIG. 5 shows a cross section of such a casting of the present device as it would appear through section I-I' of FIG. 3 before machining. For purposes of clarity, numerical references are limited to those necessary to set forth a method of fabrication. As shown, the casting resembles the finished device with the exception that the apertures and open regions are not fully formed.

First, a bore having edges defined by lines 50 in FIG. 5 is machined completely through the center of the casting to form what will eventually become the further aperture of the annular body. As such, the diameter of the bore is defined by the tap diameter necessary to allow creation of threads in the annular body so as to accommodate the connecting rod.

Second, a further larger diameter counterbore having edges defined by lines 51 in FIG. 5 is machined partially through the center of the casting. The diameter of the counterbore should be chosen to remove enough of the casting so as create the substantially open regions between the plurality of arms. Since the annular body must engage the connecting rod with enough force to keep the entire oiler assembly together, the depth of the counterbore should be limited so as to leave intact enough of the annular body necessary to properly secure the further aperture to the connecting rod. Furthermore, the depth of the counterbore should be sufficiently large so as to properly clear the substantially open region between the plurality of arms thereby allowing a substantial flow of lubricating fluid to flow between the arms during the filling of the reservoir.

The aperture and further aperture are finished by threading the sidewalls of the counterbore and bore respectively. The thread spacing of the sidewalls of the aperture is chosen to allow the proper engagement of the cap and the disc-shaped body. Similarly, the thread spacing of the further aperture is chosen to allow the connecting rod and the sidewalls of the annular circular body to properly engage.

A section internal and concentric to the further hub 9 is machined smooth to provide the substantially smooth section 10 which engages the gasket 40 between the top cover 10 and the top section of the reservoir 32.

The cap 34 is formed in a separate manufacturing process. For example, such a cap may be formed as a machined part, likely made on a screw or machine lathe and structured to be accommodated by the disc-shaped body 1. Additionally, the cap should be threaded so as to properly engage the sidewalls 2 of the aperture and, thus, provide an effective seal therebetween.

It should be noted that all of the features inherent in the connecting member of the prior art devices are herein incorporated in an integrated structure. Thus, such features are essentially formed as a by-product of machining the central aperture of the present top cover thus eliminating the separate connecting member and the attendant manufacturing steps. Because the machining of the casting is kept to a minimum, a cost advantage is realized. Furthermore, since the cap 34 may be manufactured in a separate manufacturing step than used to manufacture the disc-shaped body 1, the attendant costs associated with attaching a hinged lid to the top cover are eliminated.

Although modifications and changes may be suggested by those skilled in the art, it is the intention of the inventor to embody within the patent waranted hereon any changes and modifications as reasonably and properly come within the scope of this contribution to the art.

I claim:

1. A cover for a cylindrical receptacle for containing a fluid therein and having a securement extending axially through the center of said receptacle for securing said cover to said receptacle, said cover comprising:
   a disc-shaped body having a first circular aperture in the center thereof;
   a cap means detachably mounted about said first aperture for preventing a flow of fluid therethrough;
   a plurality of arms extending axially downward from said body about the perimeter of said first aperture, said plurality of arms and said disc shaped body made as an integral assembly from a single piece of material, said plurality of arms spaced apart so as to create substantially open regions therebetween for allowing a flow of said fluid therethrough when filling said cylindrical receptacle; and an annular body made from said single piece of material and integral with said plurality of arms, said annular body having a second circular aperture in the center thereof providing means for securing said cover to said securement.

2. A cover as recited in claim 1, wherein said first aperture in said disc-shspaed body is defined by threaded sidewalls and wherein said cap means is threaded for removably engaging said threaded sidewalls of said first aperture.

3. A cover as recited in claim 1 further comprising a hub extending downward from said disc-shaped body and located about the perimeter thereof for securely engaging said cylindrical receptacle.

4. A cover as recited in claim 1 wherein said second circular aperture is defined by threaded sidewalls for threadedly engaging said securement.

5. A cover as recited in claim 4 further comprising a plurality of elongated protrusions extending radially about said first aperture and protruding upward from said disc-shaped body thereby providing the user with a grip for securing said cover to said securement.

6. A cover as recited in claim 1, further comprising an upwardly extending hub proceeding about the perimeter of said first aperture for engaging said cap means thereby providing an effective seal therebetween.

7. A cover as recited in claim 1, wherein said disc-shaped body comprises a substantially flat section for engaging said receptacle thereby providing an effective seal therebetween.

* * * * *